C. F. FERNALD
SHOCK ABSORBER
APPLICATION FILED OCT. 24, 1912.
1,090,292.
Patented Mar. 17, 1914.
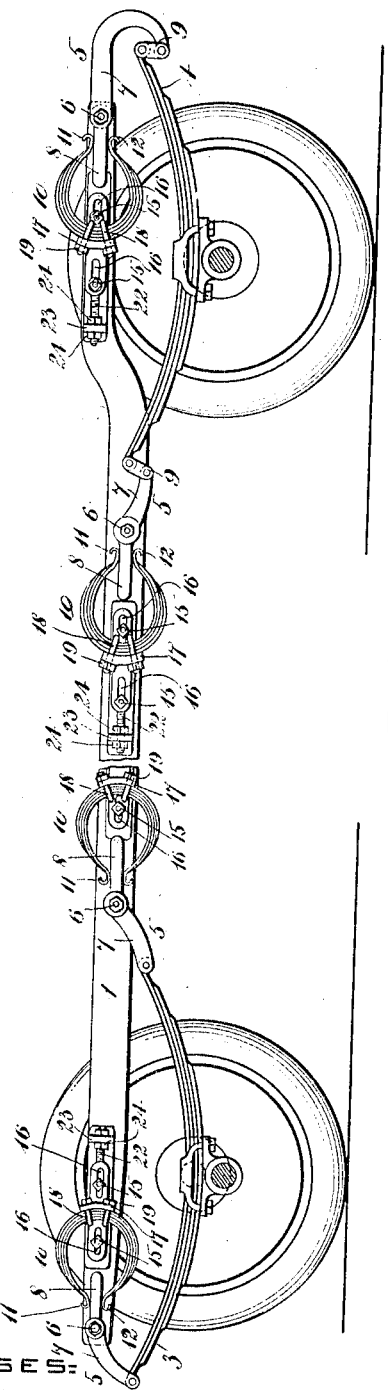

UNITED STATES PATENT OFFICE.

CHARLES F. FERNALD, OF BOSTON, MASSACHUSETTS.

SHOCK-ABSORBER.

1,090,292.
Specification of Letters Patent.
Patented Mar. 17, 1914.

Application filed October 24, 1912. Serial No. 727,519.

*To all whom it may concern:*

Be it known that I, CHARLES F. FERNALD, of Boston, in the county of Suffolk and State of Massachusetts, a citizen of the United States, have invented a new and useful Improvement in Shock-Absorbers, of which the following is a full, clear, and exact description, reference being had to the accompanying drawings, forming a part of this specification, in explaining its nature.

My invention relates to shock absorbers especially adapted for use in connection with automobiles.

The object of my invention is to provide a shock absorber in the nature of an attachment which can be combined with any of the conventional forms of springs used in automobiles and which will operate to supplement the action of the spring in yieldingly supporting the vehicle and will also prevent the sudden reflex or backlash of the spring when the weight of the vehicle or influence tending to compress the spring is suddenly released and which is so destructive to springs.

My invention can best be seen and understood by reference to the drawings, in which—

Figure 1 shows in side elevation the device embodying my invention, that portion of the frame or body of an automobile also being shown as is necessary for the proper understanding of the application of the device. Fig. 2 is a plan of a portion of the device to which special reference will hereinafter be made. Fig. 3 is a section on line 3—3 of Fig. 2.

Referring to the drawings, 1 represents the side beam to the frame of an automobile, 3 and 4, respectively, the front and rear springs on one side of the machine.

I have shown the device embodying my invention as applied to the ends of both the front and rear springs although it may be applied to either spring or to but one end of a single spring as may be desired, the device in its adaptation to any spring or part thereof varying only in mechanical detail, by which it is fitted to coöperate with such part.

The device comprises the following parts, description thereof being made in relation to one end of a single spring: Pivotally supported to the side beam of the frame adjacent the spring with which the device is coöperating, is a lever 5. This lever is secured to the beam by means of a pin 6, or other suitable mode of retention which may be secured to the frame by bolting or otherwise. The arrangement of the pin is such that the lever will turn upon a horizontal axis within and at right angles to the vertical plane of the spring. The lever is provided with arms 7 and 8, respectively. Of these arms the arm 7 is pivotally secured to the end of the spring, a linkage connection 9 being advantageously employed especially where the end of the lever is pivotally connecting with either end of the rear spring. The other arm 8 of the lever extends forward to a pivotal point preferably in about the line of the side beam of the frame. Engaging this arm for the purpose of yieldingly holding the same against movement in a vertical plane is a C-shaped spring 10, preferably a leaf spring, the free ends 11 and 12 of which bear respectively against the upper and lower sides of the lever arm. This spring is attached to the side beam at a point beyond the end of the arm 8 by a fixture to which the spring is secured at about the center thereof in order that those portions of the spring extending from the point of its retention, the ends 11 and 12 of which bear against the lever arm, may have proper play as the spring is bent in opposite directions by a reverse movement of the lever arm. I have also provided means whereby the spring may be secured to the side beam of the frame in such manner that it may be adjusted relatively to the lever arm with which it is coöperating, or, in other words, in a manner whereby the ends 11, 12, of the spring may bear against the lever arm at variable points away from its point of fulcrumage as occasion may require.

The adjustable retention of the spring is obtained as follows: Secured to the side beam of the frame are two plates 13 and 14, respectively. Of these plates the plate 13 is a dead plate on which the plate 14 is mounted to be longitudinally adjustable thereon toward or away from the pin 6 or pivotal center of the lever 5. The plates are secured to the frame by bolts 15 which pass through the respective plates to connect with the frame in any suitable manner, slots 16 being provided in the plate 14 through which the bolts extend to permit of the adjustment of this plate as aforesaid. The spring 10 is secured to the plate 14. For the purpose of retaining the spring the plate 14 is provided with a projecting piece or member 17 and to this piece the spring is secured by means of clamps 18 which pass around the spring and through the piece 17 to become bound thereto by nuts 19. In order that the plate 14 may become securely bound to the plate 13 in any adjusted position after the bolts have been tightened, provision is made whereby the plate 14 may become wedged on to the plate 13 by the tightening of the bolts. It will be observed by reference to Fig. 3 that the plate 13 presents a top bearing surface 20 and on opposite sides thereof inclined surfaces 21. The plate 14 on the inner side thereof is formed to engage these surfaces of the plate 13 with the effect that as the bolts are tightened the plate 14 will become tightly wedged on to the plate 13 and accordingly held securely in place. The adjustable retention of the plate 14 and spring 10 carried by it, is further obtained by an arm 22 projecting from the rear end of the plate 13 in extension thereof. This arm may be formed integral with the plate 14. It extends backwardly through a piece 23 projecting from the plate 13, and is adjustably secured thereto by locking nuts 24.

According to the normal disposition and arrangement of the parts when the main spring is occupying a passive position with no weight bearing thereon the lever 5 will be turned to a position where it will exert no influence to bend the spring 10 engaging the arm 8 of the lever on opposite sides thereof as aforesaid. When, however, the main spring becomes compressed by the weight of the vehicle or becomes suddenly relaxed by the lessening of such weight creating a backlash in the spring, the operation is as follows: Upon the compression of the main spring the arm 7 of the lever 5 will become turned down and the arm 8 thereof turned up to bear against the end 11 of the spring 10 which accordingly becomes bent to resist by its tension the movement of the lever and consequently supplementing the action of the main spring in yieldingly supporting the vehicle or weight tending to compress the spring. Upon the release of the compressing weight the main spring will become extended or reflexed in a direction reverse to that of its compression causing a reverse turning of the lever to that above described, and the arm 8 thereof will become turned down to engage the end 12 of the spring 10 which by its tension resists this movement of the lever and accordingly operates to yieldingly stop reflex action of the main spring and restore it to its normal position.

Of course the shock absorbing influence afforded by the spring 10 will depend upon the size and strength of the spring and the distance which its respective arms are engaging the arm 8 of the lever 5 with relation to its point of fulcrumage. A heavy spring having little flexibility would necessarily be arranged whereby the ends thereof would engage the lever arm at points a short distance removed from its point of fulcrumage or where the spring would become little disturbed or bent by the movement of the lever arm. The power exerted by the spring, however, in yieldingly resisting by its tension the movement of the lever arm increases as the distance increases at which the ends of the spring are engaging the lever arm away from its point of fulcrumage. Accordingly a spring of comparative easy flexibility may be arranged to bear against the lever arm 8 near the outer end thereof, or some distance away from its point of fulcrumage. The size or tensional strength of springs to be employed and the position of these springs will vary with the size or weight of the vehicle or conditions of usage.

According to the construction indicated springs of different sizes and degrees of tension may be affixed to the plate 14 by means of the clamps, while the proper position of any spring, or that position where it will best operate in its relation to the lever arm can easily be determined by the adjustable retention of the spring provided for as aforesaid.

What I claim as my invention is:

1. The combination in a vehicle, of a main supporting spring, a lever one arm of which pivotally connects with said spring whereby said lever may be moved thereby as said spring becomes bent, a secondary spring engaging the other arm of said lever on opposite sides thereof but yieldingly maintaining the same against movement in opposite directions, and means for adjustably retaining said secondary spring whereby it may be adjusted to engage said lever arm at variable points away from its point of fulcrumage.

2. The combination in a vehicle, of a frame, a main supporting spring, a lever pivoted to said frame, one arm of which lever pivotally connects with said spring whereby said lever may be moved thereby as said spring becomes bent, a spring secured to said frame engaging the other arm of said lever on opposite sides thereof for yieldingly retaining the same against movement in reverse direction, and means for adjustably securing said spring to said frame, said means comprising in part an adjustable plate on which said spring is mounted.

3. The combination in a vehicle of a main supporting spring, a lever one arm of which pivotally connects with said spring whereby said lever may be moved thereby as said spring becomes bent, a C-shaped spring presenting separate portions the ends of which are adapted to engage the other arm of said lever on opposite sides thereof, and means for adjustably mounting said C-shaped spring whereby the ends thereof may engage said lever arm at variable points away from its point of fulcrumage.

4. The combination in a vehicle of a frame, a main supporting spring, a lever pivoted to said frame and with one arm of which said main supporting spring pivotally connects whereby said lever may be moved thereby as said spring becomes bent, a C-shaped spring presenting portions the ends of which engage the other arm of said lever on opposite sides thereof for yieldingly retaining the same against movement in reverse directions, and means for adjustably securing said C-shaped spring to said frame, said means comprising in part an adjustable plate on which said C-shaped spring is mounted.

CHARLES F. FERNALD.

Witnesses:
 JOHN E. R. HAYES,
 M. E. FLAHERTY.